US007409094B2

(12) United States Patent
Wee et al.

(10) Patent No.: US 7,409,094 B2

(45) Date of Patent: Aug. 5, 2008

(54) METHODS AND SYSTEMS FOR PACKETIZING ENCODED DATA

(75) Inventors: Susie J. Wee, Palo Alto, CA (US); John G. Apostolopoulos, Palo Alto, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 876 days.

(21) Appl. No.: 10/941,147

(22) Filed: Sep. 14, 2004

(65) Prior Publication Data

US 2005/0084132 A1    Apr. 21, 2005

Related U.S. Application Data

(63) Continuation-in-part of application No. 10/245,009, filed on Sep. 16, 2002, now Pat. No. 7,136,485, which is a continuation-in-part of application No. 09/972,136, filed on Oct. 4, 2001, now Pat. No. 6,990,202, which is a continuation-in-part of application No. 09/849,794, filed on May 4, 2001, now Pat. No. 7,184,548.

(51) Int. Cl.
*G06K 9/36*    (2006.01)

(52) U.S. Cl. ....................... 382/232; 382/240; 382/245; 382/248

(58) Field of Classification Search ................ 382/232, 382/240, 245, 248, 250; 725/151; 398/98; 713/167; 375/240.02, 240.16, 240.26, E7.129; 348/E5.108; 370/401, 466
See application file for complete search history.

(56) References Cited

U.S. PATENT DOCUMENTS

| | | | | |
|---|---|---|---|---|
| 6,317,236 | B1 * | 11/2001 | Saunders | 398/98 |
| 6,560,282 | B2 * | 5/2003 | Tahara et al. | 375/240.02 |
| 6,598,233 | B1 * | 7/2003 | Choi | 725/151 |
| 6,931,531 | B1 * | 8/2005 | Takahashi | 713/167 |
| 7,126,993 | B2 * | 10/2006 | Kitamura et al. | 375/240.26 |
| 7,236,526 | B1 * | 6/2007 | Kitamura | 375/240.16 |

* cited by examiner

*Primary Examiner*—Anh Hong Do

(57) ABSTRACT

Systems and methods thereof for processing data are described. First information associated with encoded data is parsed. The first information describes an ordering of the encoded data. The encoded data is placed in a data packet using the first information. The data packet is organized into contiguous data segments that are delineated by truncation points that allow a transcoder to transcode the encoded data without using the first information.

31 Claims, 8 Drawing Sheets

30

METHODS AND SYSTEMS FOR PACKETIZING ENCODED DATA

CROSS REFERENCE TO RELATED APPLICATION

This Application is a Continuation-in-Part of the commonly-owned U.S. patent application, Ser. No. 10/245,009, filed Sep. 16, 2002, now U.S. Pat. No. 7,136,485 by S. J. Wee et al., and entitled "Packetizing Devices for Scalable Data Streaming," which in turn is a Continuation-in-Part of the commonly-owned U.S. patent application, Ser. No. 09/972,136, filed Oct. 4, 2001, now U.S. Pat. No. 6,990,202 by S. J. Wee et al., and entitled "Packetizing Devices for Secure Scalable Data Streaming," which in turn is a Continuation-in-Part of the commonly-owned U.S. patent application, Ser. No. 09/849,794, filed May 4, 2001, now U.S. Pat. No. 7,184,548 by S. J. Wee et al., and entitled "Encoding and Decoding Methods for Secure Scalable Streaming and Related Systems."

TECHNICAL FIELD

The present claimed invention relates to the field of streaming media data, particularly scalably encoded data.

BACKGROUND ART

Data delivery systems present many challenges for the system designer. For instance, clients can have different display, power, communication, and computational capabilities. In addition, communication links in the system can have different maximum bandwidths, quality levels, and time-varying characteristics. A successful data delivery system should be able to deliver data streams to a multitude of diverse clients over heterogeneous networks with time-varying characteristics.

Providing proper security in order to protect content from eavesdroppers is another important consideration in the design of data delivery systems. Generally, to provide security, data are transported in encrypted form.

Intermediate nodes in the system may be used to perform stream adaptation, or transcoding, to scale data streams for different downstream client capabilities and network conditions. A transcoder takes a compressed, or encoded, data stream as an input, and then processes it to produce another encoded data stream as an output. Examples of transcoding operations include bit rate reduction, rate shaping, spatial downsampling, and frame rate reduction. Transcoding can improve system scalability and efficiency, for example, by adapting the spatial resolution of an image to a particular client's display capabilities or by dynamically adjusting the bit rate of a data stream to match a network channels time-varying characteristics.

Intermediate nodes can collect and update information about local and downstream network conditions and downstream client capabilities, and then scale the data according to that information. This can be more efficient than scaling the data at the source, because it is more difficult for the source to collect up-to-date and detailed information about conditions inside the network, especially at locations in the network relatively far removed from the source. Also, the source provides only one control point at the beginning of the delivery path, while intermediate transcoding nodes provide many additional control points at more strategic locations along the delivery path.

While network transcoding facilitates scalability in data delivery systems, it also presents a number of challenges. The process of transcoding can place a substantial computational load on transcoding nodes. While computationally efficient transcoding algorithms have been developed, they may not be well-suited for processing hundreds or thousands of streams at intermediate network nodes.

Furthermore, transcoding poses a threat to the security of the delivery system because conventional transcoding operations generally require that an encrypted stream be decrypted before transcoding. The transcoded result is re-encrypted but is decrypted at the next transcoder. Each transcoder thus presents a possible breach in the security of the system. This is not an acceptable situation when end-to-end security is required.

Compression, or encoding, techniques are used to reduce the redundant information in data, thereby facilitating the storage and distribution of the data by, in effect, reducing the quantity of data. The JPEG (Joint Photographic Experts Group) standard describes one popular, contemporary scheme for encoding image data. While JPEG is satisfactory in many respects, it has its limitations when it comes to current needs. A newer standard, the JPEG2000 standard, is being developed to meet those needs. However, even with the JPEG2000 standard, decryption of encrypted data is needed for transcoding, and transcoding processes remain computationally intensive. Furthermore, the introduction of a new standard such as JPEG2000 means that each of the large number of network nodes, as well as client devices, needs to be updated in order to be made compliant with the JPEG2000 standard.

Accordingly, a method and/or system that can allow scaling (e.g., transcoding) of data in a secure and computationally efficient manner would be advantageous. A system and/or method that can accomplish those objectives on legacy devices would be more advantageous. The present invention provides these as well as other advantages.

DISCLOSURE OF THE INVENTION

Systems and methods thereof for processing data are described. In one embodiment, first information associated with encoded data is parsed. The first information describes an ordering of the encoded data. The encoded data is placed in a data packet using the first information. The data packet is organized into contiguous data segments that are delineated by truncation points that allow a transcoder to transcode the encoded data without using the first information.

BRIEF DESCRIPTION OF THE DRAWINGS

The accompanying drawings, which are incorporated in and form a part of this specification, illustrate embodiments of the invention and, together with the description, serve to explain the principles of the invention.

Figure 1:
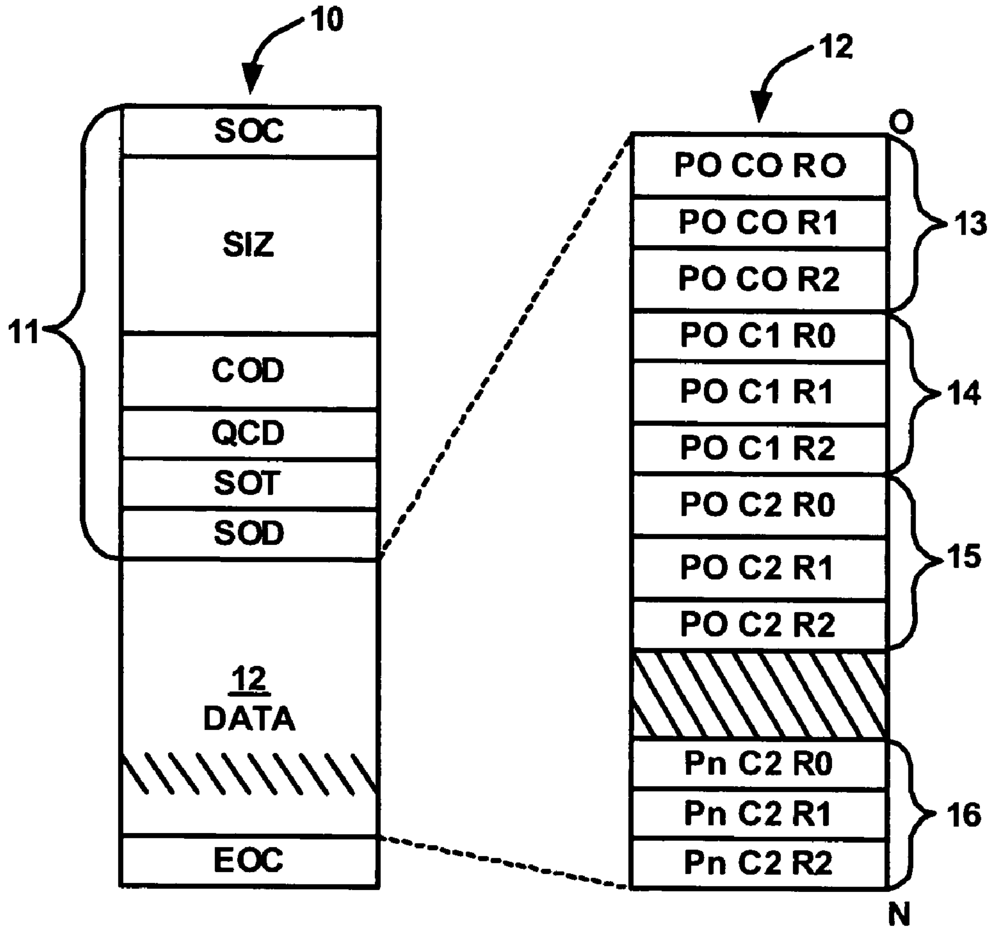
FIG. 1 is an example of a bit stream according to one embodiment of the present invention.

The drawings referred to in this description should be understood as not being drawn to scale except if specifically noted.

BEST MODES FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Embodiments in accordance with the present invention are discussed primarily in the context of digital image data, in particular for still images. Digital image data can result from "real world" capture using a digital camera, for example. Digital image data can also be computer-generated using, for example, a paint program, screen capture, or the conversion of a graphic into a bitmap image. However, the present invention is not limited to digital image data. Instead, embodiments of the present invention are well suited for use with speech-based data, audio-based data, video-based data, web page-based data, graphic data, text-based data (e.g., electronic documents), and the like. Also, embodiments of the present invention can be applied to video images, because a video image is in essence a sequence of still images or frames.

Furthermore, embodiments in accordance with the present invention are described for data that are scalably encoded using an encoding scheme compliant with, or substantially compliant with, the JPEG2000 standard. However, the present invention is not so limited. In general, embodiments according to the present invention are directed toward any data that can be or is scalably encoded and, specifically, any data that combines scalable encoding with progressive encryption.

For purposes of the present application, scalable encoding is defined as a process which takes original data as input and creates scalably encoded data as output, where the scalably encoded data has the property that portions of it can be used to reconstruct the original data at different levels of quality, resolution and the like. Specifically, the scalably encoded data is often thought of as an embedded bit stream. A portion of the bit stream can be used to decode a baseline-quality reconstruction of the original data, without requiring any information from other portions of the bit stream. Progressively larger portions of the bit stream can be used to decode improved reconstructions of the original data. JPEG2000 is one example of a scalable encoding scheme. Other scalable encoding schemes that may be used in accordance with embodiments of the present invention include, but are not limited to, 3D subband coding and MPEG-4 FGS (Moving Picture Experts Group-4 Fine Granularity Scalability).

For purposes of the present application, progressive encryption is defined as a process which takes original data (plain text) as input and creates progressively encrypted data (cipher text) as output, where the progressively encrypted data has the property that a first portion of the encrypted data can be decrypted alone, without requiring information from the remainder of the original data. Progressively larger portions can be decrypted with this same property, in which decryption can require data from earlier but not later portions of the bit stream. Progressive encryption techniques that may be used in accordance with the present invention include, but are not limited to, popular encryption primitives such as the Data Encryption Standard (DES), Triple-Des (3DES), and the Advanced Encryption Standard (AES).

General Discussion of JPEG2000 Encoding

In general, a number of stages constitute an encoding process compliant with the JPEG2000 standard. These stages are referred to herein as 1) preprocessing; 2) discrete wavelet transformation; 3) quantization; 4) embedded block coding; 5) rate control; and 6) bit stream organization. Embodiments of the present invention are not limited to these stages, and are also not limited to the particulars of the JPEG2000 standard described below. In fact, as will be seen, embodiments of the present invention introduce features beyond the syntax of the JPEG2000 standard, resulting in scaling (e.g., transcoding) processes that are more computationally efficient, and allowing scaling to be performed by devices that perhaps are not aware of the JPEG2000 standard.

JPEG2000 allows for both lossless and lossy compression; the focus herein is on lossy compression. During preprocessing, tiling can be optionally performed to partition an original image into tiles. Also during preprocessing, the input data may be adjusted so that the data has a nominal dynamic range centered on the value zero. Finally during preprocessing, color data may be transformed into Y, $C_r$ and $C_b$ color components.

During discrete wavelet transformation, image tiles can be decomposed into high and low subbands. Tiles can also be partitioned into code-blocks (e.g., 64×64 or 32×32 samples). More specifically, each subband is divided into rectangular blocks called precincts, and each precinct is further divided into non-overlapping rectangles called code-blocks.

The wavelet coefficients are quantized during the quantization stage. In the embedded block coding stage, each code-block is encoded separately. Rate control is a process by which the encoded bit stream is altered so that a target bit rate can be reached. Each encoded code-block may be reviewed to determine the extent to which it can be truncated in order to achieve the target bit rate.

FIG. 1 is an example of a JPEG2000 bit stream 10 including a header 11 and encoded data 12 according to one embodiment of the present invention. In bit stream 10, encoded data 12 are separated into what are referred to in the JPEG2000 standard as "packets" 13, 14, 15 and 16 (the contents of a JPEG2000 packet are described by the JPEG2000 standard). The packets are then multiplexed together in an ordered manner into a bit stream. Note that the use of the term "packets" according to JPEG2000 is generally different from the more conventional use of that term. That is, JPEG2000 packets are multiplexed into a bit stream, which may then be packetized into data packets that are sent over a network, for example. According to embodiments of the present invention, JPEG2000 packets are placed into scalable data packets.

According to JPEG2000, the order of the data in the bit stream is referred to as a progression. There are a number of different ways to order the packets, such as precinct-component-resolution-quality or resolution-quality-component-precinct. According to JPEG2000, quality may instead be referred to as layer. These terms are known to those who are familiar with the JPEG2000 standard.

The order of the data in the JPEG2000 bit stream may extend through the length of the bit stream. Alternatively, the order of the data in the JPEG2000 bit stream may change to a different order at some point in the bit stream. The order of the data at any particular point in the bit stream is not of significance to the discussion herein; what is of significance is that the data are in a particular order that is prescribed by the encoding scheme, in this case an encoding scheme compliant or substantially compliant with the JPEG2000 standard.

Header 11 includes a start of code stream marker SOC, an image and tile size marker SIZ, a coding style default marker COD, a quantization default marker QCD, a start of tile-part marker SOT, and a start of data marker SOD. Bit stream 10 also includes an end of code stream marker EOC. The functions performed by each of these markers are understood by those familiar with the JPEG2000 standard. The information in header 11 is also referred to herein as "first information."

In the example of FIG. 1, the encoded data 12 is ordered according to a precinct-component-resolution progression; however, as presented above, different progressions can be used. The progression (order) of the encoded data 12 is identified in header 11. In the example of FIG. 1, there are n precincts (P0, P1, . . . , Pn), three (3) color components (C0, C1, and C2), and 3 resolutions (R0, R1 and R2). Encoded data 12 is ordered from most significant to least significant. In the example of FIG. 1, the encoded data 12 is ordered first by precinct, then by component, then by resolution, and then by quality. Accordingly, for each precinct, there are 3 color components, and for each color component per precinct, there are 3 resolutions. For simplicity, quality (L) is not included in the illustration. If, for example, there were 3 quality levels (L1, L2 and L3), then there would be 3 quality levels per resolution per color component per precinct.

According to JPEG2000, it is possible to locate, extract and transcode the data required for a desired image product, without decoding the entire bit stream. Conventionally, to extract those bits, knowledge of the scheme used to encode the data (e.g., a JPEG2000-compliant scheme) is required. For instance, to find bits for transcoding or decoding using conventional means, a transcoding or decoding device needs to be aware of JPEG2000 in order to read the bit stream 10. As will be seen, embodiments of the present invention allow bits to be extracted for transcoding or decoding without requiring knowledge of the encoding scheme.

Elements of a Data Delivery System

Figure 2:
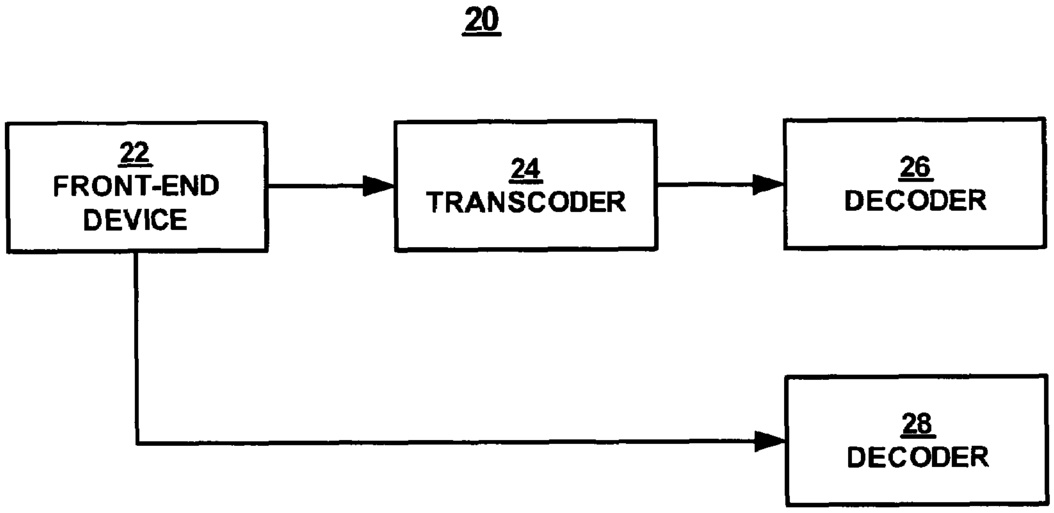
FIG. 2 is a block diagram showing functional elements in a simplified data delivery system according to one embodiment of the present invention.

FIG. 2 is a block diagram showing functional elements in a simplified data delivery system 20 according to one embodiment of the present invention. In the example of FIG. 2, system 20 includes a front-end device 22, a transcoder 24, a first decoder 26 and a second decoder 28. System 20 may be part of a larger system or network that includes similar functional elements as well as other types of functional elements (e.g., storage elements, packetizers, streaming elements and the like). In general, front-end device 22 processes data before the data is streamed to a transcoder or decoder. The functionality provided by front-end device 22 is discussed further in conjunction with FIG. 3. As will be seen from that discussion, the functionality provided by front-end device 22 may be distributed across a number of devices.

Transcoder 24 of FIG. 2 transcodes (e.g., scales) encoded data, and decoders 26 and 28 decode (decompress) data. These functionalities may be performed in a single device or distributed among multiple devices that may be connected in some type of network.

Transcoder 24 may send a scaled version of encoded data to another transcoder, which in turn scales the scaled data and sends it to another transcoder, and so on. Also, even though decoder 26 receives scaled data from transcoder 24, decoder 26 may further scale (transcode) the scaled data. Decoder 28, which does not receive data that has been transcoded, can transcode the data as well as decode the data.

Furthermore, the decoder 26 and 28 may not be the end-user device. For example, decoder 26 and 28 may decode encoded data, and send the decoded data to, for example, a mobile phone that renders and displays the image product.

Moreover, the data scaling function may be performed by a storage device or driver. For example, a storage device (e.g., a disk drive or DVD player) may scale the encoded data, passing only the appropriate data segments to the actual decoder. In this manner, resources or time are not wasted sending unnecessary information. This can also simplify the decoder, because the decoder does not need to perform this processing.

Scalable Encoding With JPEG2000

Figure 3:
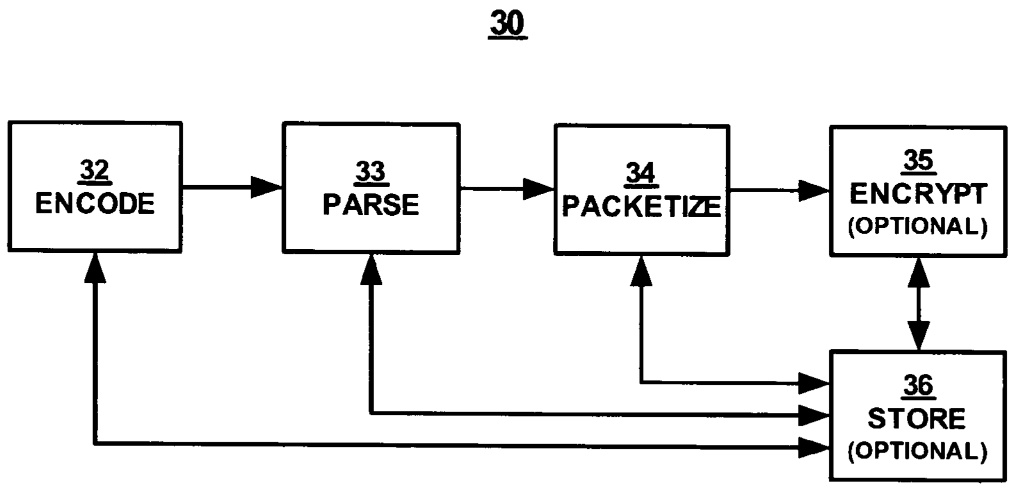
FIG. 3 shows the flow of data through one embodiment of a process for packetizing data according to the present invention.

FIG. 3 shows the flow of data in one embodiment of a process 30 for packetizing data according to the present invention. Various functional blocks are illustrated in FIG. 3. The functionality associated with each of these blocks may be performed in a single device (e.g., front-end device 22 of FIG. 2) or distributed among multiple devices that may be connected in some type of network. For example, data can be encoded on one device, stored at that device or on another device, and then fed to a parsing and packetizing device.

In block 32 of FIG. 3, data are scalably encoded (compressed) using an appropriate compression scheme, in particular a compression scheme compliant with or substantially compliant with JPEG2000. JPEG2000 can be described as a file-based compression scheme, in that the encoded data are stored as a file that can then be streamed through a network and compiled at a transcoder or decoder device for transcoding and/or decoding. According to JPEG2000, the encoded data are placed in a file format, but without consideration of network packetization.

In block 33, the encoded data is parsed. Specifically, with reference also to FIG. 1, the header 11 of the JPEG2000 bitstream 10 is parsed to extract the coding parameters used in the bitstream. The extracted parameters include image size, data ordering (e.g., precinct/color component/resolution/quality), number of resolutions, precinct sizes, and number of quality levels.

In block 34 of FIG. 3, the encoded data 12 (FIG. 1) is extracted from the bitstream 10 and placed into one or more scalable data packets; that is, the encoded data 12 is packetized. The encoded data 12 is deliberately placed into the scalable data packet(s) in a prioritized manner so that transcoding can be performed without knowledge of the encoding scheme. in one embodiment, this is achieved by placing "higher priority" data in earlier portions of the scalable data packets and "lower priority" portions in subsequent portions of the scalable data packets so that transcoding can be performed with packet truncation.

More specifically, in one embodiment, data segments are extracted from the encoded 12, and extracted segments are concatenated to form a scalable data packet. The data segments are delineated by what are referred to herein as "truncation points." Truncation points are used in transcoding a scalable data packet, as explained further below in conjunction with FIG. 7.

A truncation point can be identified using some type of marker (e.g., a start code) embedded within the encoded data in the scalable data packet. Alternatively, a truncation point can be identified by identifying a particular bit (e.g., by bit number) within the string of data formed by the concatenated data segments. In the latter case, the truncation point can be recorded as header data in a header portion of the scalable data packet. This is described further below in conjunction with FIGS. 4, 5A and 5B.

The header data in a scalable data packet is also referred to herein as "second information" or "metadata." In addition to or instead of information that identifies the truncation points, various types of other information can be included in the header data of a scalable data packet. For example, the header data of a scalable data packet can include information identifying a sequence number for the data packet and/or prioritization information that indicates the relative importance of the data packet. The header data of a scalable data packet can also include information describing the features of the encoded data in the scalable data packets, including image-specific features such as but not limited to spatial area (referred to as precincts or tiles in JPEG2000), color component, resolution level, quality level, tile (JPEG2000), and/or distortion information.

In block 35 of FIG. 3, in one embodiment, the encoded data in the scalable data packet(s) is progressively encrypted. Header data in the scalable data packet (if any) can also be encrypted, or the header data can remain unencrypted. In one embodiment, a random initialization vector is used to encrypt each scalable data packet to prevent known plain text attacks, and padding may be appended to the end of the data packet to make the packet length amenable to the encryption method being used. Progressive encryption techniques that may be used include, but are not limited to, DES, 3DES and AES.

In block 36, data are optionally stored. Storage of data can occur at any single point within process 30, or at multiple points. Data that has been packetized by process 30 can then be streamed to a downstream device, or stored for streaming at a later time.

Data can be pipelined through process 30, allowing the various functions of process 30 to be performed in parallel on various portions of the data. That is, for example, a portion of data can be encoded while a preceding portion of the data (previously encoded) is parsed and packetized.

Figure 4:
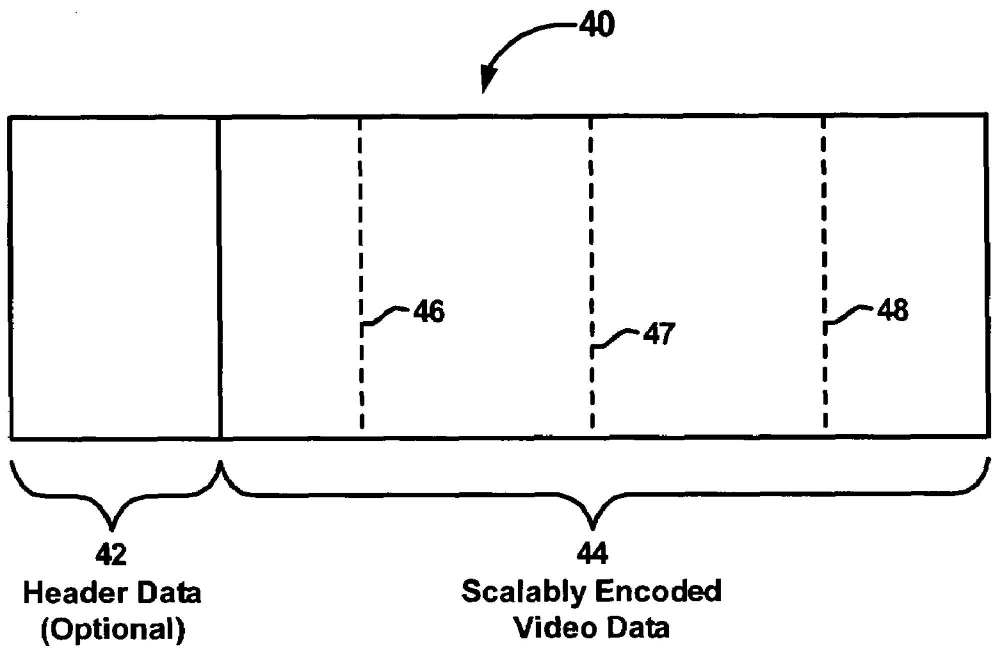
FIG. 4 is a representation of a data packet in accordance with one embodiment of the present invention.

With reference now to FIG. 4, a representation of a scalable data packet 40 formed in accordance with one embodiment of the present invention is shown. In the present embodiments, data packet 40 is generated by the process described in FIG. 3.

In the example of FIG. 4, data packet 40 includes optional header portion 42 and scalably encoded data portion 44. As mentioned above, header portion 42 includes information that is used by a transcoder to transcode the scalably encoded data portion 44. For example, header portion 42 may contain information specifying recommended points (e.g., a bit number) for truncating the payload portion (e.g., the scalably encoded data portion 44) of data packet 40. Importantly, the information in the header portion 42 allows the encoded data portion 44 to be transcoded without decoding the encoded data. Furthermore, the information in the header portion 42 allows the encoded data portion 44 to be transcoded without the transcoder having to read or understand the encoded data. Moreover, if the encoded data are encrypted, the information in the header portion 42 allows the encoded data portion 44 to be transcoded without decrypting the encoded data.

Header portion 42 may also contain information identifying each data packet by number, for example. In the latter case, a transcoder can eliminate certain data packets from the stream; for example, if every other packet is to be eliminated (e.g., the odd-numbered packets), a transcoder can use the information in header portion 42 to identify the odd-numbered data packets and eliminate those from the stream of data packets.

Other types of information can be included in header portion 42, as discussed above in conjunction with FIG. 3. This other information can also be used by a transcoder to transcode the scalably encoded data portion 44.

The information in header portion 42 is, in general, written in accordance with a defined syntax that is understood by the transcoder. A transcoder does not necessarily have to understand all of the information in the header portion 42. That is, a transcoder may only understand that portion of header portion 42 that enables the transcoder to transcode the encoded data portion 44. For example, if a transcoder operates by truncating the encoded data portion 44, then that transcoder need only understand how to identify truncation points from the header portion 42.

In the example of FIG. 4, data packet 40 includes potential truncation points 46, 47 and 48 within scalably encoded data portion 44. The present invention is well suited to having a lesser or greater number of truncation points. Also, one data packet may have different truncation points and/or a different number of truncation points than another data packet.

In an alternate embodiment, data packet 40 does not include header portion 42, and instead includes only scalably encoded data portion 44. As noted above; the truncation points 46, 47 and 48 can be identified using markers (e.g., start code) that are embedded in the data portion and read by a device with transcoding functionality. In another embodiment, the device with transcoding functionality is separately informed of where the truncation points are located. For example, information that identifies the locations of truncation points can be delivered to a transcoder or decoder separately from the stream that contains data packet 40. Alternatively, a transcoding device can be simply commanded to truncate data packets at certain points. That is, the transcoding device itself may not have knowledge of where the truncation points are, but can truncate data packets at certain points in response to commands received from another device that has knowledge of the locations of the truncation points.

In one embodiment, both header portion 42 and scalably encoded data portion 44 are encrypted. If the header portion 42 is encrypted, it can be decrypted by the transcoder. In another embodiment, only scalably encoded data portion 44 is encrypted. In yet another embodiment, neither header portion 42 nor data portion 44 are encrypted.

Figure 5A:
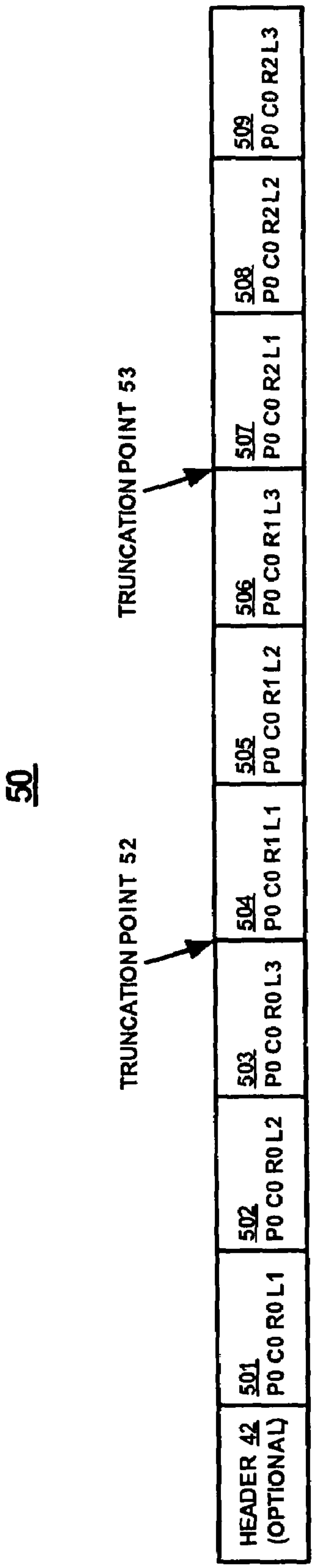
FIG. 5A illustrates one example of a data packet containing scalably encoded data in accordance with one embodiment of the present invention.

FIG. 5A illustrates one example of a scalable data packet 50 containing scalably encoded data in accordance with one embodiment of the present invention. In the example of FIG. 5A, with reference also to FIG. 1, the JPEG2000 packet 13 is arranged as a number of contiguous or adjacent data segments 501-509. The data segments 501-509 constitute the data portion 44 of FIG. 4. The example of FIG. 5A shows 3 quality levels, which are not shown in FIG. 1.

Truncation point 52 delineates the data segments 501-503 from the following set of data segments, and truncation point 53 similarly delineates the data segments 504-506 from the data segments 507-509. There may be other data segments following data segment 509 in scalable data packet 50, in which case additional truncation points can be defined. In one embodiment, the truncation points 52 and 53 are recorded in header portion 42 of scalable data packet 50.

In the example of FIG. 5A, scalable data packet 50 is associated with only a single JPEG2000 packet (JPEG2000 packet 13). Alternatively, scalable data packet 50 can include data segments associated with one or more of the other JPEG2000 packets 14-16.

According to embodiments of the present invention, scalable data packet 50 is formed by parsing header 11 to identify the coding parameters used in the bit stream 10. In essence, using the information in header 11, the locations of the various JPEG2000 packets 13-16 in the bit stream and the order of the data (e.g., PCRL) within each JPEG2000 packet are identified. Other coding parameters can also be identified. Based on the information in header 11, data of interest can be extracted from encoded data 12 and placed into scalable data packet 50.

In one embodiment, the information in the JPEG2000 header 11 is used to specify the truncation points 52 and 53. The JPEG-2000 standard evolved from EBCOT (Embedded Block Coding with Optimal Truncation), which uses a concept of Post-Compression Rate Distortion (PCRD) optimization to optimally code an image into a bitstream with a desired target bitrate. This is done by gathering rate distortion (RD) curve characteristics for different code-blocks, and coding each code-block into an embedded bitstream. Specific target bitrates are achieved by extracting the appropriate RD-optimal portions of data from each code-block and reorganizing these into the final embedded bitstream.

In JPEG-2000 and EBCOT, the code-block RD information is used to optimally encode an image into a desired target bitrate. In accordance with various embodiments of the present invention, this information is used to calculate truncation points that can be included in packet headers to provide hints to downstream transcoders for bitrate reduction. By using this header information, transcoders can perform RD-optimal transcoding across packets.

During the transformation of JPEG2000 packets into scalable data packets, not all of the encoded data 12 in the JPEG2000 bit stream 10 is necessarily placed into a scalable data packet. One or more JPEG2000 packets may be skipped in entirety, or some portion of one or more JPEG2000 packets may be skipped.

In the example of FIG. 5A, the JPEG2000 bit stream 10 consists of 3 resolution levels, with 3 quality levels per resolution. Accordingly, the parser and packetizer blocks 33 and 34 of FIG. 3 place nine (9) consecutive JPEG2000 packets into scalable data packet 50. The scalable data packet 50 thus contains all the resolution levels and quality levels for a particular precinct and color component. The encoded data can be padded if necessary and perhaps encrypted.

Figure 5B:
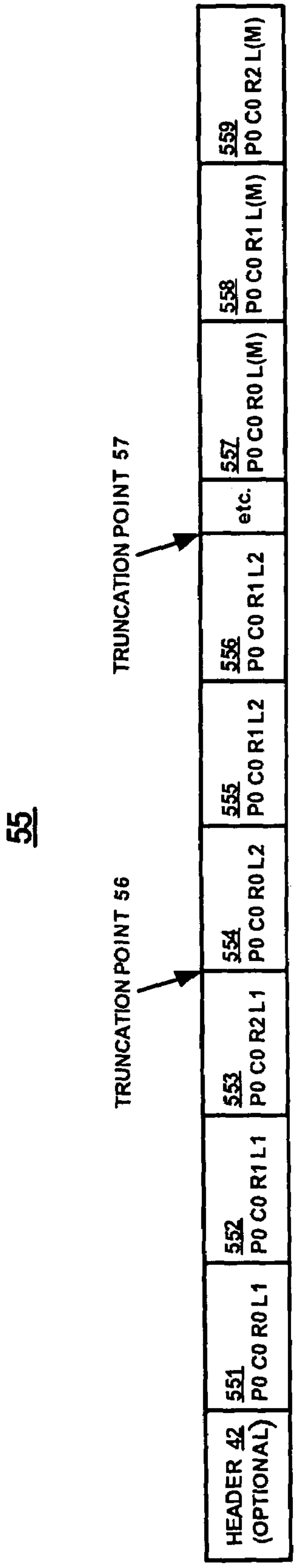
FIG. 5B illustrates another example of a data packet containing scalably encoded data in accordance with one embodiment of the present invention.

Although the order of the data in the JPEG2000 packet 13 is maintained in scalable data packet 50, the present invention is not so limited (see FIG. 5B, for example). For instance, the data in a JPEG2000 packet can be reordered when packetized as a scalable data packet. Conversely, the particular order of the encoded data in scalable data packet 50 can be created regardless of the order of the encoded data in the JPEG2000 packet(s). In the latter case, for example, the parser 33 and packetizer 34 (FIG. 3) can selectively extract from JPEG2000 bit stream 10 (FIG. 1) all of the R0 components and place them in a scalable data packet, followed by all of the R1 components, etc. In general, from any initial encoding order in the JPEG2000 bit stream, any other order can be created in the scalable data packet.

FIG. 5B illustrates an example of a data packet 55 containing scalably encoded data in accordance with one embodiment of the present invention. In the example of FIG. 5B, with reference also to FIG. 1, the JPEG2000 packet 13 is arranged as a number of contiguous or adjacent data segments 551-559. The data segments 551-559 constitute the data portion 44 of FIG. 4. The example of FIG. 5B shows M quality levels, which are not shown in FIG. 1.

Truncation point 56 delineates the data segments 551-553 from the following set of data segments, and truncation point 57 similarly delineates the data segments 554-556 from a following set of data segments. Other truncation points (not shown) are similarly defined. In one embodiment, the truncation points 56 and 57 are recorded in header portion 42 of scalable data packet 55.

In the example of FIG. 5B, with 3 resolution levels and M quality levels, the parser and packetizer blocks 33 and 34 of FIG. 3 place 3×M JPEG2000 packets into scalable data packet 55. The scalable data packet 55 thus contains all of the resolution levels and quality levels of a particular precinct and color component. In scalable data packet 55, the encoded data is ordered so that all of the resolution components of a particular quality level are grouped and placed adjacent to one another, and these groups are ordered by increasing quality level. With M quality levels, M truncation points can be specified, each truncation point marking the beginning of a different quality level. The encoded data can be padded if necessary and perhaps encrypted.

Figure 6:
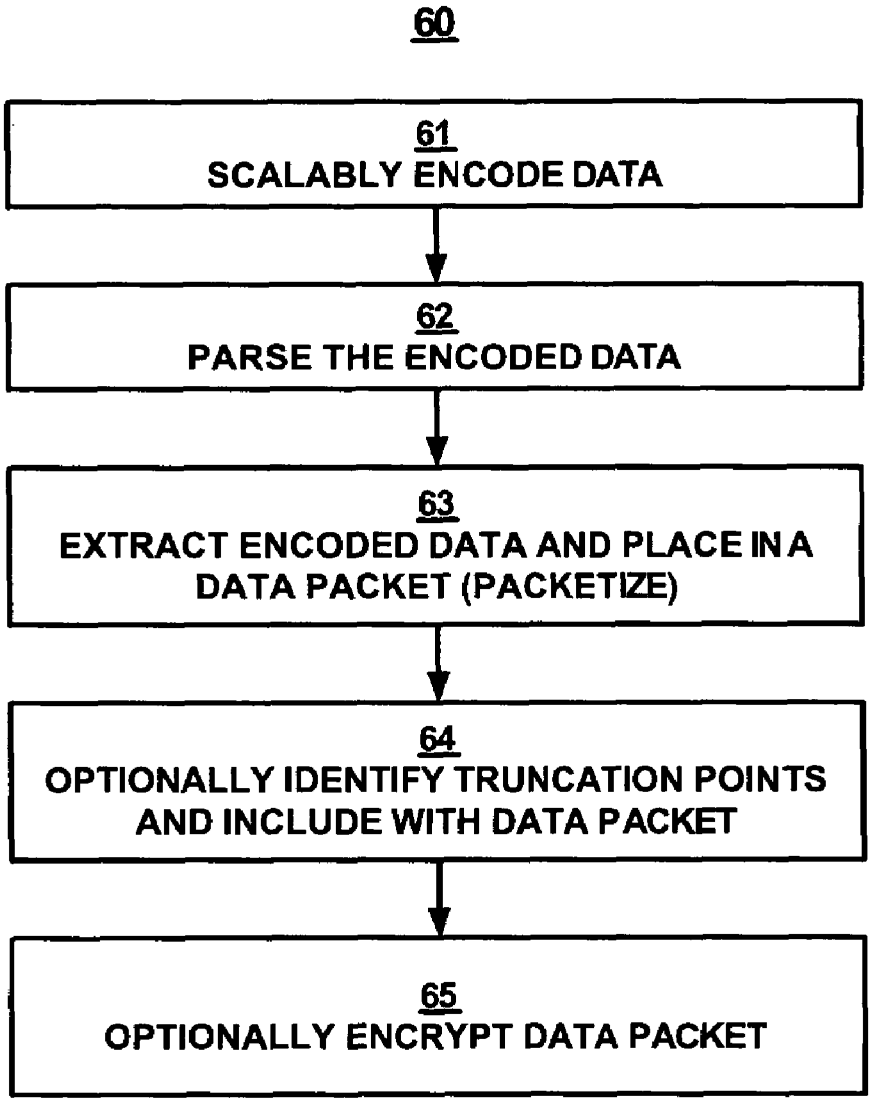
FIG. 6 is a flowchart of a method for processing data in accordance with one embodiment of the present invention.

FIG. 6 is a flowchart 60 of a method for processing data in accordance with one embodiment of the present invention. Although specific steps are illustrated in FIG. 6, such steps are exemplary, and the present invention is well suited to performing various other steps or variations of the steps included in flowchart 60. Flowchart 60, in one embodiment, is carried out by a processor or processors under the control of computer-readable and computer-executable instructions. The computer-readable and computer-executable instructions reside, for example, in data storage features such as computer-usable volatile memory, computer-usable non-volatile memory, and/or a data storage device. As mentioned in conjunction with FIG. 3, flowchart 60 may be performed at a single device, or it may be performed using multiple devices.

In step 61 of FIG. 6, the data is scalably encoded and arranged in an initial order. In one embodiment, the encoding scheme is essentially compliant with JPEG2000.

In step 62, the encoded data is parsed. In one embodiment, information ("first information") that describes the initial order of the encoded data is parsed. In one such embodiment, that information is provided in the header of a JPEG2000 bit stream.

In step 63, encoded data is extracted and placed into a scalable data packet in a certain order that may be different from the initial order. In one embodiment, the information describing the initial order of the encoded data is used to locate the data to be extracted. For example, a first segment of encoded data can be located, extracted and packetized; a second segment of encoded data can be similarly located, extracted and packetized by concatenating it with the first segment; and so on.

In step 64, in one embodiment, truncation points that demarcate the various data segments in the scalable data packet are identified. In one embodiment, second information describing the location of each truncation point is included in a header of the scalable data packet. In another embodiment, each truncation point is identified by, for example, a start code that is embedded within the encoded data in the scalable data packet. Other mechanisms, such as those described herein, can be used to identify truncation points to a transcoding device.

In step 65, in one embodiment, the encoded data in the scalable data packet is encrypted. In one such embodiment, the scalable data packet is progressively encrypted. If the scalable data packet also includes a header, in one embodiment the header is also encrypted; in another embodiment, the header is not encrypted.

The scalable data packet can be stored or streamed to a device that can perform a transcoding function. More than one scalable data packet may be created from the encoded data. Also, a set of encoded data can be packetized into different types of scalable data packets (e.g., scalable data packets that are ordered differently from one another, or that contain different subsets of the encoded data).

The steps in flowchart 60 can be performed in series or in parallel. In the latter case, some portion of the data may be at some point in the process, with another portion of the data at another point in the process. Also, the amount of data may be reduced at any point in the process. For example, while all of the data may be encoded, perhaps only some of the data is packetized, or perhaps the packetized data is transcoded before encryption.

Figure 7:
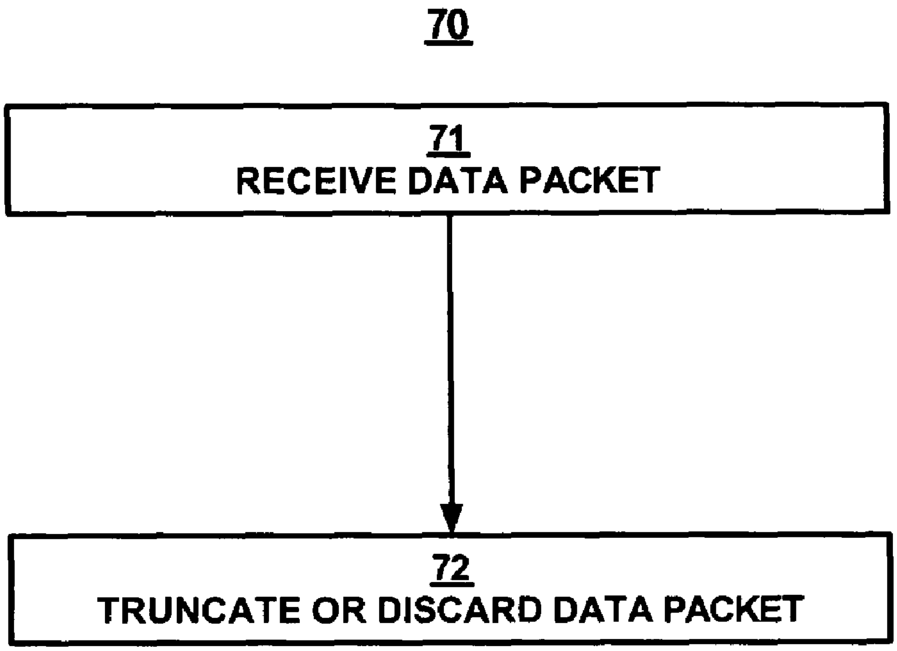
FIG. 7 is a flowchart of a method for transcoding data in accordance with one embodiment of the present invention.

FIG. 7 is a flowchart 70 of a method for transcoding data in accordance with one embodiment of the present invention. Although specific steps are illustrated in FIG. 7, such steps are exemplary, and the present invention is well suited to performing various other steps or variations of the steps included in flowchart 70. Flowchart 70, in one embodiment, is carried out by a processor under the control of computer-readable and computer-executable instructions. The computer-readable and computer-executable instructions reside, for example, in data storage features such as computer-usable volatile memory, computer-usable non-volatile memory, and/or a data storage device.

In step 71, a scalable data packet is received at a device with transcoding functionality. The scalable data packet may have both a header portion and a data portion, or it may have only a data portion. The header portion and the data portion may or may not be encrypted.

In step 72, the scalable data packet is transcoded. The purpose of transcoding is to configure the data packet according to attributes downstream of the transcoder, such as the attributes of the end-user device or network conditions. Transcoding can include, for example, truncation of the data packet or discarding of the data packet. Referring back to FIG. 5A, to reduce bit rate while preserving a certain level of resolution, scalable data packet 50 can be truncated at truncation point 53 to discard all R2 data while preserving all R0 and R1 data. The bit rate can be reduced further by further reducing resolution, which is achieved by truncating scalable data packet 50 at truncation point 52, preserving only the R0 data.

Importantly, if the encoded data are encrypted, the transcoding can be performed without decrypting the encoded data. In the example above, it is not necessary to decrypt the data in order to identify either of the truncation points 52 and 53. A truncation point can be identified by its position in the bit stream (e.g., by its bit number), and the data does not need to be decrypted in order to locate a position within the data.

In an embodiment in which the scalable data packet includes a header portion, the transcoding device reads the header portion. Information in the header portion can be used to make transcoding decisions. In one embodiment, the truncation points are specified in the information that is included in the header portion.

The header portion may instead (or also) contain information identifying each data packet by number, for example. Accordingly, a transcoding device can eliminate certain data packets from the stream. For example, if every other packet is to be eliminated (e.g., the odd-numbered packets), a transcoding device can use the header information to identify the odd-numbered data packets and eliminate those from the stream of data packets.

In an embodiment in which the scalable data packet does not include a header portion, a transcoding device can make transcoding decisions based on a pre-defined set of rules. For example, all data packets in the stream can be truncated at the same point. Alternatively, the transcoding device may receive a command from another device that tells the transcoding device where to truncate the data packet, or the locations of the truncation points may be provided to the transcoding device in some manner apart from the scalable data packet.

In summary, according to the various embodiments of the present invention, scalable data packets are created from a scalably encoded bit stream by parsing the bit stream and packetizing the encoded data. The encoded data is deliberately placed into the scalable data packets in a prioritized manner so that transcoding can be performed with packet truncation. That is, higher priority data is placed in earlier portions of the scalable data packet and lower priority data in the later portions; during transcoding, the later portions can be truncated to reduce the amount of data while preserving the higher priority data. Recommended truncation points are identified and, in one embodiment, included in a header portion of the scalable data packet. The truncation points are used by transcoding devices as a guide to the transcoding operation.

A scalable data packet can be made secure by encrypting it with a progressive encryption scheme. The header portion may or may not be encrypted.

Transcoding devices can adapt the scalable data packets for the capabilities of client devices and for network conditions. A transcoding device can read the unencrypted header information at the beginning of a scalable data packet, and then discard or truncate the data packet using the header information. The transcoding device can perform the transcoding operation without decrypting the encoded data, thus maintaining the security of the encoded data (if the header portion is encrypted, only the header portion needs to be decrypted by the transcoding device).

Furthermore, the transcoding device can perform near rate-distortion optimal transcoding across multiple data packets by adapting the truncation of each packet based on the recommended truncation points contained in the header portion of each data packet.

According to the embodiments of the present invention, a transcoding device does not require knowledge of the specific compression algorithm, media type, or encryption algorithm. Also, embodiments in accordance with the present invention allow delivery systems to simultaneously achieve two seeming conflicting objectives: network node transcoding and end-to-end security.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A system for processing data, said system comprising:

a parser for extracting first information from encoded data that is encoded using a compression scheme for still images, said first information describing an ordering of said encoded data; and a packetizer that uses said first information to place said encoded data into a data packet, wherein said data packet is organized as a plurality of contiguous data segments that are delineated by truncation points that allow a transcoder to transcode said encoded data without using said first information.

2. The system of claim 1 wherein said data packet further comprises a header portion comprising second information derived from said first information and identifying said truncation points.

3. The system of claim 1 wherein said compression scheme is substantially compliant with the JPEG2000 standard.

4. The system of claim 1 wherein said first information further comprises encoding parameters for said encoded data, said encoding parameters selected from the group consisting of number of resolutions, precinct sizes, and number of quality levels.

5. The system of claim 1 wherein said second information further comprises information selected from the group consisting of information identifying a sequence number for said data packet, prioritization information for said data packet, spatial area features of said encoded data, color component features of said encoded data, resolution levels of said encoded data, quality levels of said encoded data, and distortion information.

6. The system of claim 1 further comprising an encrypter for encrypting said encoded data.

7. The system of claim 1 further comprising an encoder for encoding said data to generate said encoded data.

8. The system of claim 1 wherein said encoded data is received by said packetizer in a first order and placed in said data packet in a second order different from said first order.

9. The system of claim 1 wherein said truncation points are identified by markers embedded within said encoded data in said data packet.

10. A method of processing data, said method comprising:

parsing first information associated with encoded data that is encoded using a file-based compression scheme, said first information describing an ordering of said encoded data; and arranging said encoded data in a data packet using said first information, wherein said encoded data is arranged in said data packet as a plurality of adjacent data segments that are demarcated by truncation points that are usable for transcoding said encoded data without using said first information.

11. The method of claim 10 further comprising:

deriving second information from said first information, wherein said second information identifies said truncation points; and including said second information in said data packet.

12. The method of claim 11 wherein said second information is included in a header portion of said data packet.

13. The method of claim 11 wherein said second information is embedded within said encoded data as markers that mark said truncation points.

14. The method of claim 11 wherein said second information further comprises information selected from the group consisting of information identifying a sequence number for said data packet, prioritization information for said data packet, spatial area features of said encoded data, color component features of said encoded data, resolution levels of said encoded data, quality levels of said encoded data, and distortion information.

15. The method of claim 10 wherein said compression scheme is substantially compliant with the JPEG2000 standard.

16. The method of claim 10 wherein said first information further comprises encoding parameters for said encoded data, said encoding parameters selected from the group consisting of number of resolutions, precinct sizes, and number of quality levels.

17. The method of claim 10 further comprising encrypting said encoded data.

18. The method of claim 10 further comprising encoding said data to generate said encoded data.

19. The method of claim 10 further comprising storing said encoded data.

20. The method of claim 10 further comprising:

receiving said encoded data in a first order; and arranging said encoded data in said data packet in a second order different from said first order.

21. A computer-usable medium having computer-readable code stored thereon for causing a device to perform a method for processing data, said method comprising:

reading first information associated with encoded data that is encoded using a file-based compression scheme, said first information describing an ordering of said encoded data; and ordering said encoded data in a data packet using said first information, wherein said encoded data is placed in said data packet in ordered data segments that are defined by truncation points that allow transcoding of said encoded data without said first information.

22. The computer-usable medium of claim 21 wherein said method further comprises:

deriving second information from said first information, wherein said second information identifies said truncation points; and including said second information in said data packet.

23. The computer-usable medium of claim 22 wherein said second information is included in a header portion of said data packet.

24. The computer-usable medium of claim 22 wherein said second information is embedded within said encoded data as markers that mark said truncation points.

25. The computer-usable medium of claim 22 wherein said second information further comprises information selected from the group consisting of information identifying a sequence number for said data packet, prioritization information for said data packet, spatial area features of said encoded data, color component features of said encoded data, resolution levels of said encoded data, quality levels of said encoded data, and distortion information.

26. The computer-usable medium of claim 21 wherein said compression scheme is substantially compliant with the JPEG2000 standard.

27. The computer-usable medium of claim 21 wherein said first information further comprises encoding parameters for said encoded data, said encoding parameters selected from the group consisting of number of resolutions, precinct sizes, and number of quality levels.

28. The computer-usable medium of claim 21 wherein said method further comprises encrypting said encoded data.

29. The computer-usable medium of claim 21 wherein said method further comprises encoding said data to generate said encoded data.

30. The computer-usable medium of claim 21 wherein said method further comprises storing said encoded data.

31. The computer-usable medium of claim 21 wherein said method further comprises:

receiving said encoded data in a first order; and placing said encoded data in said data packet in a second order different from said first order.

* * * * *